(12) United States Patent
Hase et al.

(10) Patent No.: US 6,190,577 B1
(45) Date of Patent: Feb. 20, 2001

(54) INDIUM-SUBSTITUTED ALUMINATE PHOSPHOR AND METHOD FOR MAKING THE SAME

(75) Inventors: Takashi Hase, Chester; Sawsan Aziz, Hackettstown, both of NJ (US)

(73) Assignee: USR Optonix Inc., Hackettstown, NJ (US)

( * ) Notice: Under 35 U.S.C. 154(b), the term of this patent shall be extended for 0 days.

(21) Appl. No.: 09/358,251

(22) Filed: Jul. 20, 1999

(51) Int. Cl.$^7$ .......................... C07K 11/62; C07K 11/64; C07K 11/55; C07K 11/54
(52) U.S. Cl. .......................... 252/301.4 R; 252/301.4 H; 252/301.6 R
(58) Field of Search .................. 252/301.4 R, 301.4 H, 252/301.6 R, 301.6 H (56) References Cited

U.S. PATENT DOCUMENTS

| | | | |
|---|---|---|---|
| 4,216,408 | * 8/1980 | Verstegen et al. ............ | 252/301.4 R |
| 5,376,303 | * 12/1994 | Royce et al. .................. | 252/301.4 R |
| 5,424,006 | * 6/1995 | Murayama et al. ........... | 252/301.4 R |
| 5,611,959 | * 3/1997 | Kijima et al. ................. | 252/301.4 R |
| 5,686,022 | * 11/1997 | Murayama et al. ........... | 252/301.4 R |

* cited by examiner

Primary Examiner—C. Melissa Koslow
(74) Attorney, Agent, or Firm—Oblon, Spivak, McClelland, Maier & Neustadt, P.C.

(57) ABSTRACT

A phosphor containing O, Al, In, at least one element M selected from a group consisting of Sr, Ca and Ba, and Eu, as an activator, where the M, the Al, the In and the Eu are present in an atomic ratio M:Al:In:Eu of m:2n(1−y):2n(y):a, $0.3<m/n\leq 2$, $0\leq y\leq 0.2$, and $1\times 10^{-5}\leq a\leq 1\times 10^{-1}$, exhibits excellent luminance, afterglow and durability. Also a phosphor containing O, Al, In, B, at least one element M selected from a group consisting of Sr, Ca and Ba, and $Eu^{2+}$ as an activator, where the M, the Al, the In, the B and the Eu are present in an atomic ratio M:Al:In:B:Eu of m:2n(1−y−z):2n(y−z):2n(z):a, $0.3\leq m/n\leq 2$, $0<y\leq 0.2$, $0<z\leq 0.05$, and $1\times 10^{-5}\leq a\leq 1\times 10^{-1}$ exhibits excellent luminance, afterglow and durability.

36 Claims, 7 Drawing Sheets

INDIUM-SUBSTITUTED ALUMINATE PHOSPHOR AND METHOD FOR MAKING THE SAME

BACKGROUND OF THE INVENTION

1. Field of the Invention

The present invention relates to an indium-substituted aluminate phosphor and a method for making the same or more precisely, an aluminate-based phosphor whose aluminum element is partially substituted with indium and a method for making the phosphor.

2. Description of the Background

Luminescent substances such as fluorescent pigments and phosphors emit visible light when they are stimulated by the absorption of UV radiation, visible light or both. While fluorescent substances cease to emit the light immediately after the stimulus is removed, phosphors continue to emit the light for a considerable period after the stimulus is removed. This characteristic of phosphors is called phosphorescence, and because of this characteristic, phosphors are widely used in luminous clocks, watches, evacuation signs, traffic safety signs and indoor displays of various kinds.

Recently, aluminate-based phosphors such as $SrAl_2O_4$: Eu, Dy and silicate-based phosphors such as $Sr_2MgSi_2O_7$: Eu, Dy have been developed. These phosphors have solved many shortcomings of the conventional sulfide-based phosphors; however, their luminance and afterglow characteristics need further improvement.

An aluminate phosphor is disclosed in U.S. Pat. No. 5,376,303 (hereinafter referred to as the '303 patent) under the title "Long Decay Phosphors". This phosphor is comprised of rare-earth metal activated, divalent, boron-substituted aluminates.

Another aluminate phosphor is disclosed in U.S. Pat. No. 5,424,006 (hereinafter referred to as the '006 patent) under the title "Phosphorescent Phosphor". This phosphor is activated by europium and is comprised of aluminate and at least one metal element selected from calcium, strontium and barium.

Yet another aluminate phosphor is disclosed in U.S. Pat. No. 5,686,022 (hereinafter referred to as the '022 patent) under the title "Phosphorescent Phosphor". This phosphor has a composition similar to the phosphor disclosed in the '006 patent but differs in the ratio of the metal constituent, M, and the oxygen constituent, O.

The contents of these patents are incorporated herein by reference in their entirety.

SUMMARY OF THE INVENTION

An object of the present invention is to provide a novel phosphor composition with excellent luminance, afterglow and durability.

This object can be achieved by a phosphor containing oxygen, aluminum, indium, at least one element M selected from a group consisting of Sr, Ca and Ba, optionally at least one element M' selected from a group consisting of Mg, Zn and Cd, $Eu^{2+}$ as an activator, optionally at least one element Ln selected from a group consisting of Sc, Y, La, Ce, Pr, Nd, Sm, Gd, Tb, Dy, Ho, Er, Tm, Yb, Lu, B, Ga, Tl, Sb, Bi, As, P, Sn, Si, Ge, Pb, Ti, Zr, Hf, V, Nb, Ta, Mo, W, Cr and Mn as a co-activator, and optionally at least one halogen element X. The elements may be in the atomic ratio $M:M':Al:In:Eu^{2+}:Ln:X$ of $m(1-x):m(x):2n(1-y):2n(y):a:b:c$ where $0.3 \leq m/n \leq 2$, $0 \leq x \leq 0.2$, $0 < y \leq 0.2$, $1 \times 10^{-5} \leq a \leq 1 \times 10^{-1}$, $0 \leq b \leq 1 \times 10^{-1}$ and $0 \leq c \leq 1 \times 10^{-1}$.

This object can also be achieved by a phosphor containing oxygen, aluminum, indium, boron, at least one element M selected from a group consisting of Sr, Ca and Ba, optionally at least one element M' selected from a group consisting of Mg, Zn and Cd, $Eu^{2+}$ as an activator, optionally at least one element Ln selected from a group consisting of Sc, Y, La, Ce, Pr, Nd, Sm, Gd, Tb, Dy, Ho, Er, Tm, Yb, Lu, Ga, Tl, Sb, Bi, As, P, Sn, Si, Ge, Pb, Ti, Zr, Hf, V, Nb, Ta, Mo, W, Cr and Mn as a co-activator, and optionally at least one halogen element X. The elements may be in an atomic ratio $M:M':Al:In:B:Eu^{2+}:Ln:X$ of $m(1-x):m(x):2n(1-y-z):2n(y-z):2n(z):a:b:c$ where $0.3 \leq m/n \leq 2$, $0 \leq x \leq 0.2$, $0 < y \leq 0.2$, $0 < z \leq 0.05$, $1 \times 10^{-5} \leq a \leq 1 \times 10^{-1}$, $0 \leq b \leq 1 \times 10^{-1}$ and $0 \leq c \leq 1 \times 10^{-1}$.

This object can also be achieved by a phosphor containing oxygen, aluminum, indium, boron, at least one element M selected from a group consisting of Sr, Ca and Ba, optionally at least one element M' selected from a group consisting of Mg, Zn and Cd, and $Eu^{2+}$ as an activator. The elements may be in an atomic ratio $M:M':Al:In:B:Eu^{2+}$ of $m(1-x):m(x):2n(1-y-z):2n(y-z):2n(z):a$ where $0.3 \leq m/n \leq 2$, $0 \leq x \leq 0.2$, $0 < y \leq 0.2$, $0 < z \leq 0.05$ and $1 \times 10^{-5} \leq a \leq 1 \times 10^{-1}$.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE PREFERRED EMBODIMENTS

In the phosphor composition of formula (I), $$m(M_{1-x} M'_x)O \; n(Al_{1-y} In_y)_2O_3: aEu^{2+}, bLn, cX \qquad (I),$$

M is at least one element selected from a group consisting of Sr, Ca and Ba, and M' is at least one element selected from a group consisting of Mg, Zn and Cd. Europium, represented as $Eu^{2+}$ in formula (I), acts as an activator, and Ln which is at least one element selected from a group consisting of Sc, Y, La, Ce, Pr, Nd, Sm, Gd, Tb, Dy, Ho, Er, Tm, Yb, Lu, B, Ga, Tl, Sb, Bi, As, P, Sn, Si, Ge, Pb, Ti, Zr, Hf, V, Nb, Ta, Mo, W, Cr and Mn acts as a co-activator. X represents at least one halogen.

An alphabetical index "x" represents an amount of the metal element "M" and has the range of $0 \leq x \leq 0.2$, preferably $0 \leq x \leq 0.1$. If the value of x exceeds 0.2, the improvement on the duration of afterglow diminishes. Also, an alphabetical index "y" represents an amount of aluminum, Al, and has the range of $0 < y \leq 0.2$, preferably $1 \times 10^{-5} \leq y \leq 0.1$. If the value of y exceeds 0.2, the improvement on the duration of afterglow diminishes and the luminance begins to decrease.

Alphabetical indexes "m" and "n" determine the ratio between the metals in $(M_{1-x} M'_x)O$ and the indium and aluminum in $(Al_{1-y} In_y)_2O_3$, in the composition. The value of the ratio, m/n, has the range of $0.3 \leq m/n \leq 2$, preferably $0.4 \leq m/n \leq 1.5$. If the value of m/n falls outside the preceding range, undesirable compounds are formed or starting oxidized materials remain in the composition. As a result, the luminance of the phosphors diminishes.

An alphabetical index "a" represents an amount of $Eu^{2+}$ and has the range of $1 \times 10^{-5} \leq a \leq 1 \times 10^{-1}$, preferably $1 \times 10^{-4} \leq a \leq 5 \times 10^{-2}$. If the value of a is less than $1 \times 10^{-5}$, the number of the luminescent centers effected by $Eu^{2+}$ in the phosphor becomes insufficient and thus a desired intensity of luminance cannot be obtained. Similarly, if the value of a exceeds $1 \times 10^{-1}$, concentration quenching takes place and the luminance as well as afterglow of the phosphor will be impaired.

An alphabetical index "b" represents an amount of Ln and has the range of $0 \leq b \leq 1 \times 10^{-1}$, preferably $0 \leq b \leq 5 \times 10^{-2}$. If the value of b exceeds $1 \times 10^{-1}$, the co-activator Ln dominates the activator $Eu^{2+}$ and begins to emit light itself, as a result, the intended color region ranging between blue and yellow cannot be obtained.

Although a halogen is known to act as a flux during the preparation of phosphors, some of it is incorporated into this chemical composition and helps the formation of phosphor crystals as well as the diffusion of luminescent centers effected by the activator and trapping sites effected by the co-activator throughout the phosphor. In turn, the halogen contributes to the improvement of the luminance and afterglow of the phosphor. An alphabetical index "c" in formula (I) represents an amount of X incorporated into the chemical composition of this phosphor and is measured after the phosphor has been washed. The value of c has the range of $0 \leq c \leq 1 \times 10^{-1}$, preferably $1 \times 10^{-5} \leq c \leq 1 \times 10^{-2}$. If the value of c exceeds $1 \times 10^{-1}$, the phosphor sinters and is difficult to pulverize.

Similar to halogens, boron serves as a flux during the preparation of phosphors. Therefore, during the preparation of the phosphor having the composition of formula (I), boron and an alkali metal are used as a flux, but they are not incorporated.

In the phosphor composition of formula (II), $$m(M_{1-x}M'_x)O\ n(Al_{1-y-z}In_yB_z)_2O_3: aEU^{2+}, bLn, cX \quad (II),$$

M is at least one element selected from a group consisting of Sr, Ca and Ba, and M' is at least one element selected from a group consisting of Mg, Zn and Cd. Europium, represented as $Eu^{2+}$ in formula (II), acts as an activator, and Ln which is at least one element selected from a group consisting of Sc, Y, La, Ce, Pr, Nd, Sm, Gd, Tb, Dy, Ho, Er, Tm, Yb, Lu, Ga, Tl, Sb, Bi, As, P, Sn, Si, Ge, Pb, Ti, Zr, Hf, V, Nb, Ta, Mo, W, Cr and Mn, acts as a co-activator. X represents at least one halogen.

An alphabetical index "x" represents an amount of the metal element "M" and has the range of $0 \leq x \leq 0.2$, preferably $0 \leq x \leq 0.1$. If the value of x exceeds 0.2, the improvement on the duration of afterglow diminishes. Also, an alphabetical index "y" represents an amount of aluminum, Al, and has the range of $0 < y \leq 0.2$, preferably $1 \times 10^{-5} \leq y \leq 0.1$. If the value of y exceeds 0.2, the improvement on the duration of afterglow diminishes and the luminance begins to decrease.

Similar to the halogen in formula (I), boron in formula (II) in part serves as a flux during the preparation of the phosphor. In formula (II), however, boron also becomes incorporated into the chemical composition because the aluminate in formula (II) becomes partially substituted with boron as well as indium. Like halogens, boron incorporated into this composition helps not only the formation of phosphor crystals but also the diffusion of luminescent centers and trapping sites throughout the phosphor. Accordingly, boron contributes to the improvement of the luminance and afterglow of the phosphor. An alphabetical index "z" represents an amount of boron, B, in formula (II). The value of z has the range of $0 < z \leq 0.05$, preferably $1 \times 10^{-5} \leq z \leq 1 \times 10^{-3}$. If the value of z exceeds phosphor sinters and is difficult to pulverize.

Alphabetical indexes "m" and "n" determine the ratio between the metals in $(M_{1-x} M'_x)O$ and the indium, aluminum and boron in $(Al_{1-y-z} In_yB_z)_2O_3$, in the composition. The value of the ratio, m/n, has the range of $0.3 \leq m/n \leq 2$, preferably $0.4 \leq m/n \leq 1.5$. If the value of m/n falls outside the preceding range, undesirable compounds are formed or starting oxidized compounds remain in the composition. As a result, the luminance of the phosphor diminishes.

An alphabetical index "a" represents an amount of $Eu^{2+}$ and has the range of $1 \times 10^{-5} \leq a \leq 1 \times 10^{-1}$, preferably $1 \times 10^{-4} \leq a \leq 5 \times 10^{-2}$. If the value of a is less than $1 \times 10^{-5}$, the number of the luminescent centers effected by $Eu^{2+}$ in the phosphor becomes insufficient and thus a desired intensity of luminance cannot be obtained. Similarly, if the value of a exceeds $1 \times 10^{-1}$, concentration quenching takes place and the luminance as well as afterglow of the phosphor will be impaired.

An alphabetical index "b" represents an amount of Ln and has the range of $0 \leq b \leq 1 \times 10^{-1}$, preferably $0 \leq b \leq 5 \times 10^{-2}$. If the value of b exceeds $1 \times 10^{-1}$, the co-activator Ln dominates the activator $Eu^{2+}$ and begins to emit light itself; as a result, the intended color region ranging between blue and yellow cannot be obtained.

Like formula (I), an alphabetical index "c" in formula (II) represents an amount of X incorporated into the chemical composition of this phosphor and is measured after the phosphor has been washed. The value of c has the range of $0 \leq c \leq 1 \times 10^{-1}$, preferably $1 \times 10^{-5} \leq c \leq 1 \times 10^{-2}$. If the value of c exceeds $1 \times 10^{-1}$, the phosphor sinters and is difficult to pulverize.

Finally, in the phosphor composition of formula (III), $$m(M_{1-x}M'_x)O\ n(Al_{1-y-z}In_yB_z)_2O_3: aEu^{2+} \quad (III),$$

M is at least one element selected from a group consisting of Sr, Ca and Ba, and M' is at least one element selected from a group consisting of Mg, Zn and Cd. $Eu^{2+}$ serves as an activator.

An alphabetical index "x" represents an amount of the metal element "M" and has the range of $0 \leq x \leq 0.2$, preferably $0 \leq x \leq 0.1$. If the value of x exceeds 0.2, the improvement on the duration of afterglow diminishes. Also, an alphabetical index "y" represents an amount of aluminum, Al, and has the range of $0<y\leq0.2$, preferably $1\times10^{-5}\leq y\leq0.1$. If the value of y exceeds 0.2, the improvement on the duration of afterglow diminishes and the luminance begins to decrease.

Like formula (II), boron in formula (III) in part serves as a flux during the preparation of phosphors. Also in formula (III), boron becomes incorporated into the composition because the aluminate becomes partially substituted with boron as well as indium. Similarly, boron incorporated into this composition helps the formation of phosphor crystals and the diffusion of luminescent centers and trapping sites throughout the phosphor. Consequently, boron contributes to the improvement of the luminance and afterglow of the phosphor. An alphabetical index "z" represents an amount of boron, B, in formula (III). The value of z has the range of $0<z\leq0.05$, preferably $1\times10^{-5}\leq z\leq1\times10^{-3}$. If the value of z exceeds 0.05, the phosphor sinters and is difficult to pulverize.

Alphabetical indexes "m" and "n" determine the ratio between the metals in $(M_{1-x} M'_x)O$ and the indium, aluminum and boron in $(Al_{1-y-z} In_y B_z)_2 O_3$, in the composition. The value of the ratio, m/n, has the range of $0.3\leq m/n\leq2$, preferably $0.4\leq m/n\leq1.5$. If the value of m/n falls outside the preceding range, undesirable compounds are formed or starting oxidized compounds remain in the composition. As a result, the luminance of the phosphor diminishes.

An alphabetical index "a" represents an amount of $Eu^{2+}$ and has the range of $1\times10^{-5}\leq a\leq1\times10^{-1}$, preferably $1\times10^{-4}\leq a\leq5\times10^{-2}$. If the value of a is less than $1\times10^{-5}$, the number of the luminescent centers effected by $Eu^{2+}$ in the phosphor becomes insufficient and a desired intensity of luminance cannot be obtained. Similarly, if the value of a exceeds $1\times10^{-1}$, concentration quenching takes place and the luminance as well as afterglow of the phosphor will be impaired.

As the composition formulae described in the phosphor patents described above, formulae (I), (II) and (III) represent the ratio of chemical elements in the phosphors of the present invention and do not necessarily suggest a molecular composition thereof.

The phosphors satisfying formulae (I), (II) and (III), and their respective numerical ranges discussed above improve chemical stability and thus durability against weather. Hence, these phosphors are suitable not only for indoor products but also outdoor products. Likewise, these phosphors emit colors ranging from blue to yellow and glow for a considerable period after their stimuli are removed. Furthermore, these phosphors reach their excited state 10% faster than the conventional $SrAl_2O_4$: Eu, Dy phosphor and thus require less exposure to UV radiation or visible light. As such, these phosphors are suitable for luminous safety signs, paints, toys, accessaries and the likes, since some of these luminous products usually do not receive sufficient UV radiation or visible light and cannot reach their sufficient luminance. Typically, the phosphor is added to a paint or coating, and then applied to the surface of the safety signs, road, toys, accessaries, etc.

As sources of the constituents, M(=Sr, Ca and Ba), M'(=Mg, Zn and Cd), Al and In, of the host material, the activator $Eu^{2+}$ and the co-activator Ln, the corresponding oxide compounds may be used. Alternatively, the corresponding salts in the form of carbonate, nitrate or chloride compounds may be used, since these compounds are easily oxidized into an oxide compound through combustion. For the halogen element X, ammonium salts or alkali metal salts are used. Alternatively, a halide compound of any element in the foregoing constituents for the host material, the activator $Eu^{2+}$ and the co-activator Ln, may be used. For boron and an alkali metal, salts in the form of a carbonate, nitrate or chloride compound may be used.

All the starting compounds necessary for a preparation of the phosphors are measured according to their stoichiometry, combined and sufficiently mixed under either a wet or dry system. Alternatively, these compounds may be mixed through the process of co-precipitation.

The mixture of these compounds may be placed in a heat-resistant container, for example, an alumina crucible, and fired for 1 hour to 12 hours at 800 to 1700° C. in a weakly reducing atmosphere comprising a mixture of hydrogen and neutral gases, or alternatively, in a weakly reducing atmosphere containing carbon. A weakly reducing atmosphere containing carbon is prepared by placing a piece of carbon or a carbon sheet in the furnace with the crucible, with neutral gases. If the firing process is repeated a number of times, the final firing process must be carried out in a weakly reducing atmosphere. The product from the foregoing processes may then be ground.

EXAMPLES

Having generally described this invention, a further understanding can be obtained by reference to certain specific examples which are provided herein for purposes of illustration only and are not intended to be limiting unless otherwise specified.

Example 1

TABLE 1

| Compound | Amount (g) |
| --- | --- |
| $SrCO_3$ | 14.8 |
| $Al_2O_3$ | 10.1 |
| $In_2O_3$ | 0.13 |
| $Eu_2O_3$ | 0.18 |
| $H_3BO_3$ | 0.49 |

The compounds in their corresponding amounts in Table 1 were combined and sufficiently mixed. The mixture was placed in an alumina crucible and fired in an electric furnace for 2 hours at 1300° C. under a weakly reducing atmosphere comprising a mixture of 97% nitrogen gas and 3% hydrogen gas. The product obtained from the foregoing process was ground, washed with water, dried and sifted.

Figure 1:
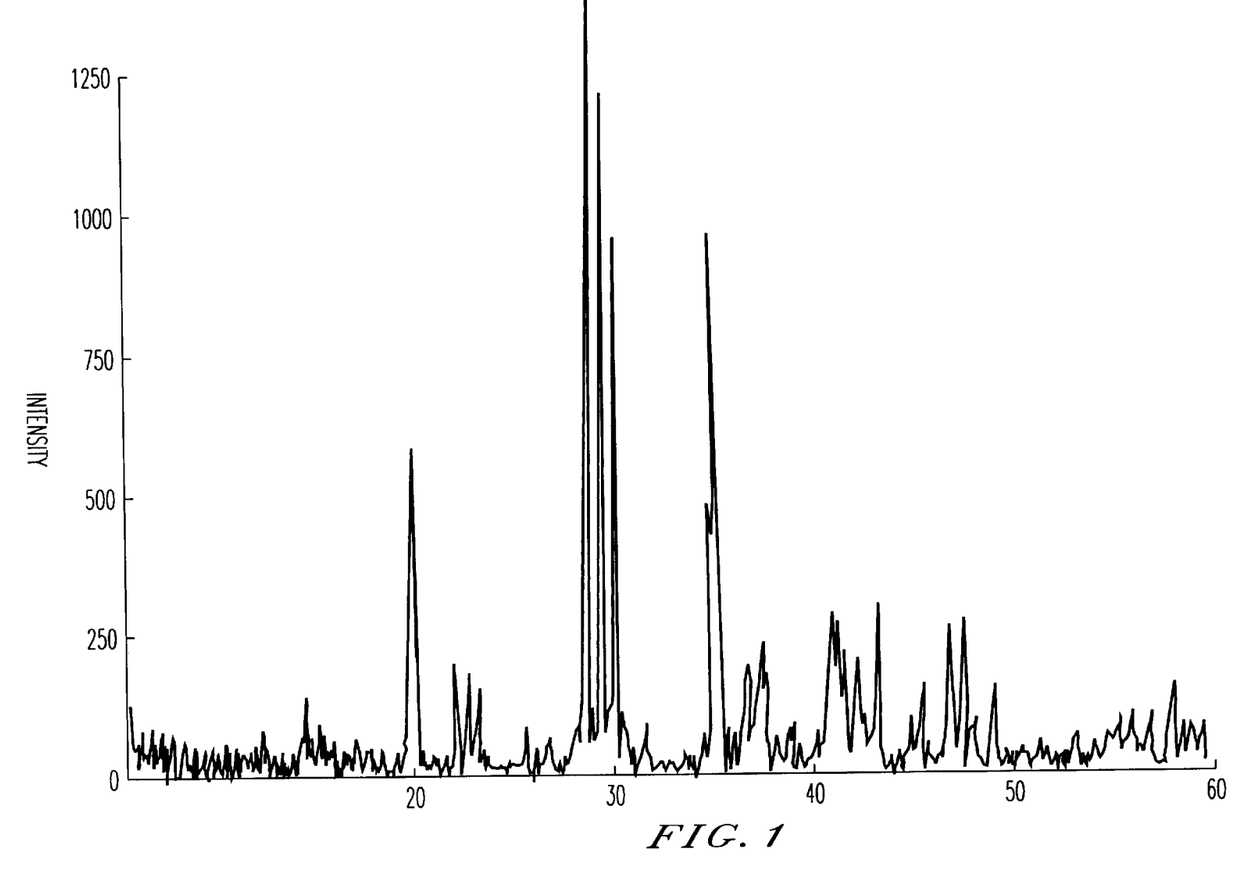
FIG. 1 is an XRD(X-ray diffraction) graph showing the result from the crystal structure analysis of the phosphor obtained in Example 1, $Sr(Al_{0.995}In_{0.005})_2O_4$: $Eu^{2+}{}_{0.01}$.

FIG. 1 is an XRD graph of the crystal structure analysis performed with the phosphor obtained in Example 1. It was confirmed from the analysis of the diffraction peaks in the graph that the phosphor had the composition of $Sr(Al_{0.995} In_{0.005})_2 O_4$: $EU^{2+}_{0.01}$. Furthermore even if the Sr and some of the Al in the composition were substituted with other elements to the extent suggested in the claims, the result remained same.

Figure 2:
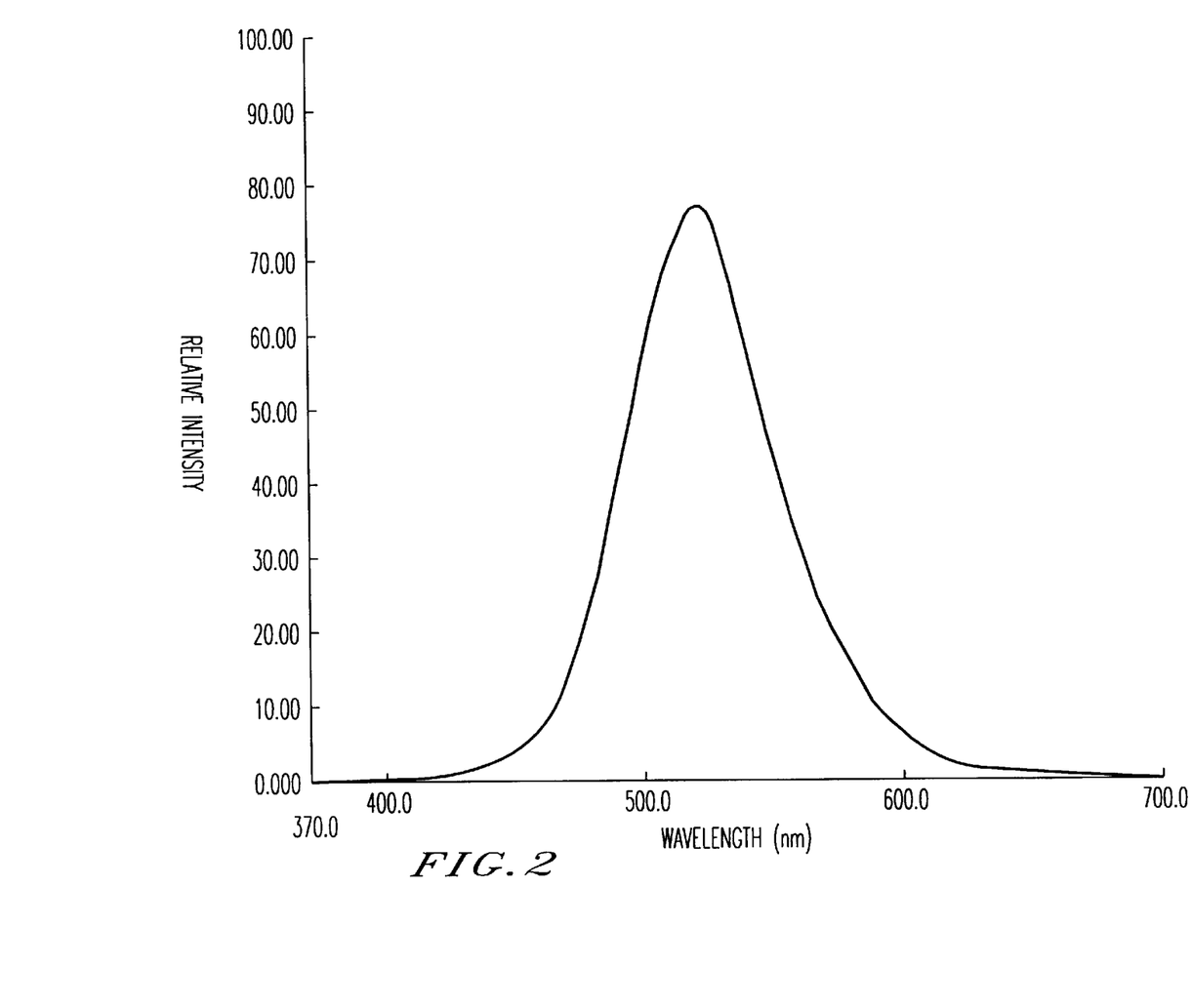
FIG. 2 is a graph showing the emission spectrum of the phosphor obtained in Example 1, $Sr(Al_{0.995}In_{0.005})_2O_4$: $Eu^{2+}{}_{0.01}$, after the phosphor was stimulated by the absorption of the UV radiation of 365 nm.

FIG. 2 shows the phosphorescent emission spectrum of the phosphor obtained in Example 1 after the phosphor has absorbed the UV radiation of 365 nm. The emission spectrum peaked at 512 nm and therefore, the phosphor had a yellow phosphorescent emission.

Figure 6:
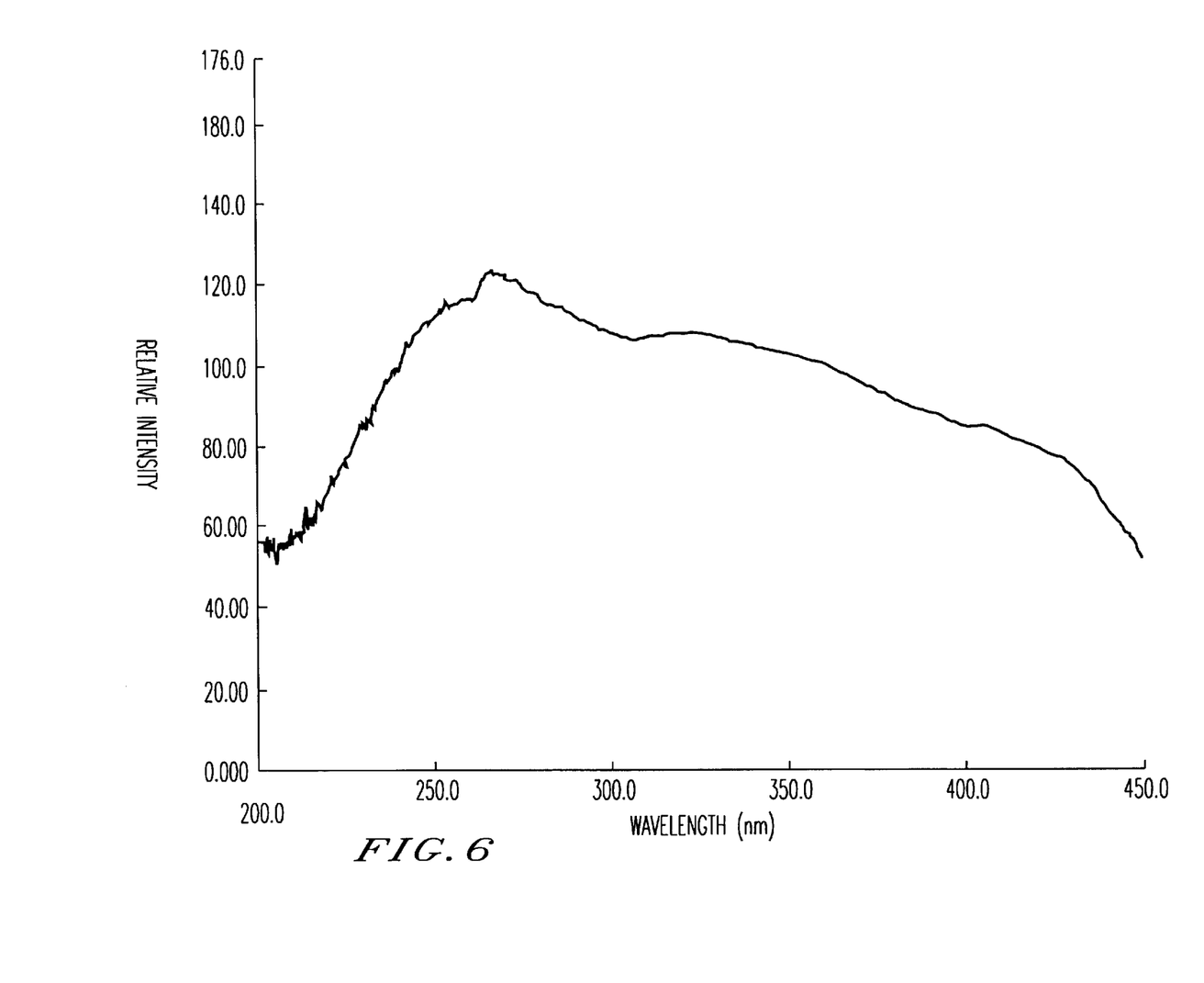
FIG. 6 is a graph showing the excitation spectrum of the phosphor obtained in Example 1, $Sr(Al_{0.995}In_{0.005})_2O_4$: $Eu^{2+}{}_{0.01}$.

FIG. 6 is the excitation spectrum of the phosphor obtained in Example 1. The spectrum was measured by setting the spectrophotometer to measure the intensity of light emitted by the phosphor at 512 nm, and irradiating the phosphor with light of varying wavelengths. Thus, the vertical coordinate in the graph represents the relative intensity of the emission by the phosphor and the horizontal coordinate in the graph represents the wavelengths of light cast on the phosphor. It shows that the spectrum extends to the visible light region.

Figure 7:
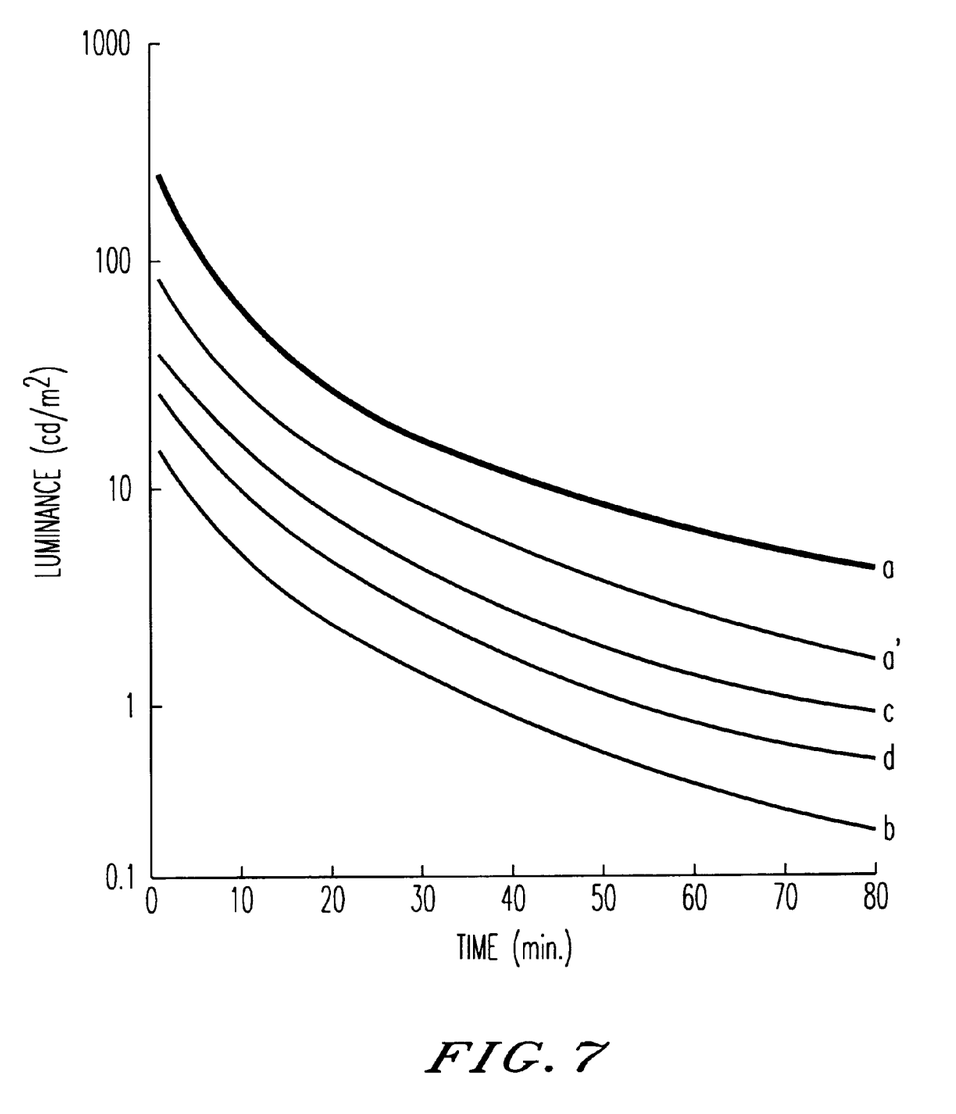
FIG. 7 is a graph showing the duration of phosphorescent afterglow by the phosphors obtained in Examples 1–4, $Sr(Al_{0.995}In_{0.005})_2O_4$: $Eu^{2+}{}_{0.01}$, $Ca(Al_{0.995}In_{0.005})_2O_4$: $Eu^{2+}{}_{0.01}$, $Ba(Al_{0.995}In_{0.005})_2O_4$: $Eu^{2+}{}_{0.01}$ and $Sr_4(Al_{0.995}In_{0.005})_{14}O_{25}$: $Eu^{2+}{}_{0.01}$, respectively, as well as the conventional aluminate phosphor, $SrAl_2O_4$: $Eu^{2+}{}_{0.01}$, $Dy_{0.01}$.

FIG. 7 is a graph showing the duration and intensity of phosphorescent afterglow by different phosphors. Each phosphor was irradiated by a daylight fluorescent lamp of 300 lux for 30 minutes and then 2 minutes later, the afterglow of each phosphor was measured by a photometer with a filter for visible light. A curve "a" is the result of the phosphor obtained in Example 1 and shows that the phosphor has a longer and more intense afterglow than the rest of the phosphors in the graph.

Example 2

TABLE 2

| Compound | Amount (g) |
| --- | --- |
| $CaCO_3$ | 10.0 |
| $Al_2O_3$ | 10.1 |
| $In_2O_3$ | 0.13 |
| $Eu_2O_3$ | 0.18 |
| $B_2O_3$ | 0.28 |

The compounds in their corresponding amounts in Table 2 were combined and sufficiently mixed. The mixture was placed in an alumina crucible and fired in an electric furnace for 2 hours at 1350° C. under a weakly reducing atmosphere containing carbon. The product obtained from the foregoing process was ground, washed with water, dried and sifted.

This phosphor had the composition $Ca(Al_{0.995} In_{0.005})_2O_4$: $Eu^{2+}{}_{0.01}$.

Figure 3:
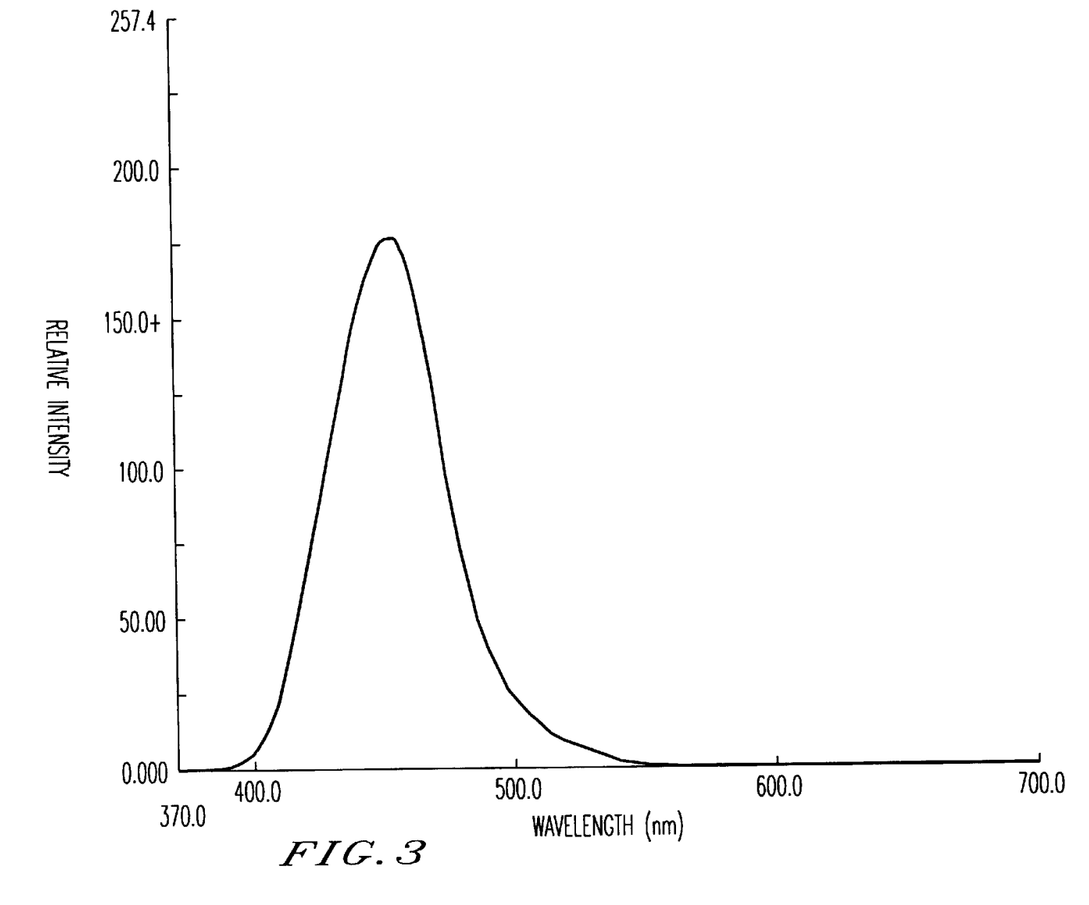
FIG. 3 is a graph showing the emission spectrum of the phosphor obtained in Example 2, $Ca(Al_{0.995}In_{0.005})_2O_4$: $Eu^{2+}{}_{0.01}$, after the phosphor was stimulated by the absorption of the UV radiation of 365 mn.

FIG. 3 shows the phosphorescent emission spectrum of the phosphor obtained in Example 2 after the phosphor had absorbed the UV radiation of 365 nm. The emission spectrum peaked at 442 nm and therefore, the phosphor had a blue phosphorescent emission.

FIG. 7 is a graph showing the duration and intensity of phosphorescence by different phosphors. A curve "b" is the result of the phosphor obtained in Example 2 and shows that the phosphor had a long afterglow.

Example 3

TABLE 3

| Compound | Amount (g) |
| --- | --- |
| $BaCO_3$ | 19.7 |
| $Al_2O_3$ | 10.1 |
| $In_2O_3$ | 0.13 |
| $Eu_2O_3$ | 0.18 |
| $H_3BO_3$ | 0.49 |

The compounds in their corresponding amounts in Table 3 were combined and sufficiently mixed. The mixture was placed in an alumina crucible and fired in an electric furnace for 2 hours at 1300° C. under a weakly reducing atmosphere comprising a mixture of 98% nitrogen gas and 2% hydrogen gas. The product obtained from the foregoing process was ground, washed with water, dried and sifted.

This phosphor had the composition $Ba(Al_{0.995} In_{0.005})_2O_4$: $Eu^{2+}{}_{0.01}$.

Figure 4:
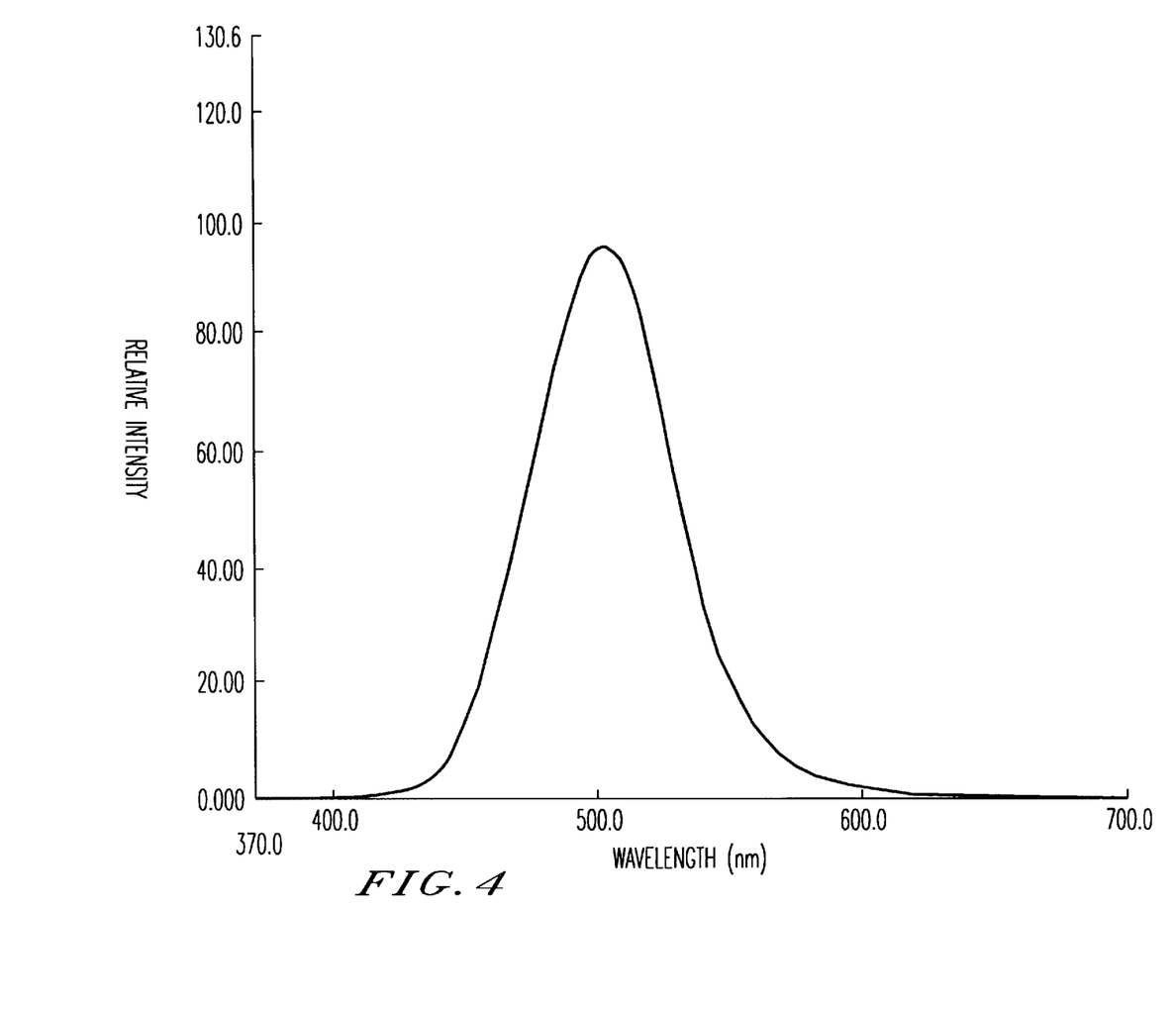
FIG. 4 is a graph showing the emission spectrum of the phosphor obtained in Example 3, $Ba(Al_{0.995}In_{0.005})_2O_4$: $Eu^{2+}{}_{0.01}$, after the phosphor was stimulated by the absorption of the UV radiation of 365 nm.

FIG. 4 shows the phosphorescent emission spectrum of the phosphor obtained in Example 3 after the phosphor has absorbed the UV radiation of 365 nm. The emission spectrum peaked at 500 nm and therefore, the phosphor had a bluish green phosphorescent emission.

FIG. 7 is a graph showing the duration and intensity of phosphorescence by different phosphors. A curve "c" is the result of the phosphor obtained in Example 3 and shows that the phosphor had a long afterglow.

Example 4

TABLE 4

| Compound | Amount (g) |
| --- | --- |
| $SrCO_3$ | 14.8 |
| $Al_2O_3$ | 17.8 |
| $In_2O_3$ | 0.24 |
| $Eu_2O_3$ | 0.04 |
| $H_3BO_3$ | 0.35 |

The compounds in their corresponding amounts in Table 4 were combined and sufficiently mixed. The mixture was placed in an alumina crucible and fired in an electric furnace for 2 hours at 1350° C. under a weakly reducing atmosphere containing carbon. The product obtained from the foregoing process was ground, washed with water, dried and sifted.

This phosphor had the composition $Sr_4(Al_{0.995} In_{0.005})_{14}O_{25}$: $Eu^{2+}{}_{0.01}$.

Figure 5:
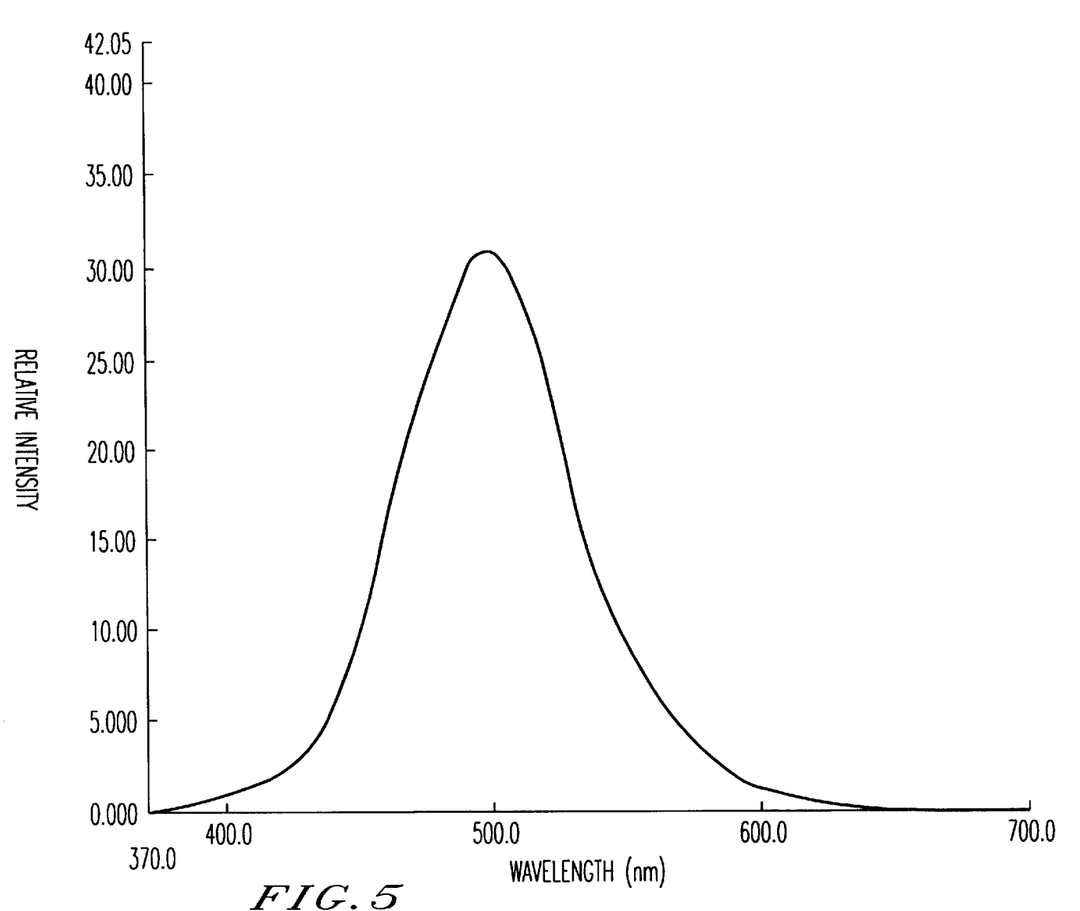
FIG. 5 is a graph showing the emission spectrum of the phosphor obtained in Example 4, $Sr_4(Al_{0.995}In_{0.005})_{14}O_{25}$: $Eu^{2+}{}_{0.01}$, after the phosphor was stimulated by the absorption of the UV radiation of 365 mn.

FIG. 5 shows the phosphorescent emission spectrum of the phosphor obtained in Example 4 after the phosphor has absorbed the UV radiation of 365 nm. The emission spectrum peaked at 497 nm and therefore, the phosphor had a bluish green phosphorescent emission.

FIG. 7 is a graph showing the duration and intensity of phosphorescence by different phosphors. A curve "d" is the result of the phosphor obtained in Example 4 and shows that the phosphor had a long afterglow.

Example 5

TABLE 5

| Compound | Amount (g) |
| --- | --- |
| $SrCO_3$ | 14.8 |
| $Al_2O_3$ | 10.1 |
| $In_2O_3$ | 0.13 |
| $Eu_2O_3$ | 0.18 |
| $Dy_2O_3$ | 0.11 |
| $H_3BO_3$ | 0.30 |

The compounds in their corresponding amounts in Table 4 were combined and sufficiently mixed. The mixture was placed in an alumina crucible and fired in an electric furnace for 2 hours at 1350° C. under a weakly reducing atmosphere containing carbon. The product obtained from the foregoing process was ground, washed with water, dried and sifted.

It was confirmed that the phosphor obtained in Example 5 has the composition of $Sr(Al_{0.995} In_{0.005})_2O_4$: $Eu^{2+}{}_{0.01}$, $Dy_{0.006}$. After absorbing the UV radiation of 365 nm, this phosphor exhibited the phosphorescent emission spectrum which peaked at 512 nm and therefore featured a similar curve as the curve in FIG. 2. This phosphor had a green phosphorescent emission. Similarly, the phosphor in Example 5 exhibited a similar duration as the curve "a" in FIG. 7 for its afterglow.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A phosphor, comprising:

a composition having a formula (I)

$$m(M_{1-x}M'_x)O \cdot n(Al_{1-y}In_y)_2O_3:aEu^{2+}, bLn, cX \quad (I)$$

wherein M is at least one element selected from a group consisting of Sr, Ca and Ba, M' is at least one element selected from a group consisting of Mg, Zn and Cd, Ln is at least one element selected from a group consisting of Sc, Y, La, Ce, Pr, Nd, Sm, Gd, Tb, Dy, Ho, Er, Tm, Yb, Lu, B, Ga, Tl, Sb, Bi, As, P, Sn, Si, Ge, Pb, Ti, Zr, Hf, V, Nb, Ta, Mo, W, Cr and Mn, X is at least one halogen, $0.3 \leq m/n \leq 2$, $0 \leq x \leq 0.2$, $0 < y \leq 0.2$, $1 \times 10^{-5} \leq a \leq 1 \times 10^{-1}$, $0 \leq b \leq 1 \times 10^{-1}$, and $0 \leq c \leq 1 \times 10^{-1}$.

2. A phosphor according to claim 1, wherein $0.4 \leq m/n \leq 1.5$, $0 \leq x \leq 0.1$, $1 \times 10^{-5} \leq y \leq 0.1$, $1 \times 10^{-4} \leq a \leq 5 \times 10^{-2}$, $0 \leq b \leq 5 \times 10^{-2}$, and $1 \times 10^{-5} \leq c \leq 1 \times 10^{-2}$.

3. A phosphor according to claim 1, wherein $0.4 \leq m/n \leq 1.5$.

4. A phosphor according to claim 1, wherein $0 \leq x \leq 0.1$.

5. A phosphor according to claim 1, wherein $1 \times 10^{-5} \leq y \leq 0.1$.

6. A phosphor according to claim 1, wherein $1 \times 10^{-4} \leq a \leq 5 \times 10^{-2}$.

7. A phosphor according to claim 1, wherein $0 \leq b \leq 5 \times 10^{-2}$.

8. A phosphor according to claim 1, wherein $1 \times 10^{-5} \leq c \leq 1 \times 10^{-2}$.

9. A method of making the phosphor of claim 1, comprising:

firing, under a reducing atmosphere, a mixture, forming said phosphor.

10. A sign, comprising the phosphor of claim 1.

11. A paint, comprising the phosphor of claim 1.

12. A toy, comprising the phosphor of claim 1.

13. A phosphor, comprising:

a composition having a formula (II)

$$m(M_{1-x}M'_x)O \cdot n(Al_{1-y-z}In_yB_z)_2O_3:aEu^{2+}, bLn, cX \quad (II)$$

wherein M is at least one element selected from a group consisting of Sr, Ca and Ba, M' is at least one element selected from a group consisting of Mg, Zn and Cd, Ln is at least one element selected from a group consisting of Sc, Y, La, Ce, Pr, Nd, Sm, Gd, Tb, Dy, Ho, Er, Tm, Yb, Lu, Ga, Ti, Sb, Bi, As, P, Sn, Si, Ge, Pb, Ti, Zr, Hf, V, Nb, Ta, Mo, W, Cr and Mn, X is at least one halogen, $0.3 \leq m/n \leq 2$, $0 \leq x \leq 0.2$, $0 < y \leq 0.2$, $0 < z \leq 0.05$, $1 \times 10^{-5} \leq a \leq 1 \times 10^{-1}$, $0 \leq b \leq 1 \times 10^{-1}$, and $0 \leq c \leq 1 \times 10^{-1}$.

14. A phosphor according to claim 13, wherein $0.4 \leq m/n \leq 1.5$, $0 \leq x \leq 0.1$, $1 \times 10^{-5} \leq y \leq 0.1$, $1 \times 10^{-5} \leq z \leq 1 \times 10^{-3}$, $1 \times 10^{-4} \leq a \leq 5 \times 10^{-2}$, $0 \leq b \leq 5 \times 10^{-2}$, and $1 \times 10^{-5} \leq c \leq 1 \times 10^{-2}$.

15. A phosphor according to claim 13, wherein $0.4 \leq m/n \leq 1.5$.

16. A phosphor according to claim 13, wherein $0 \leq x \leq 0.1$.

17. A phosphor according to claim 13, wherein $1 \times 10^{-5} \leq y \leq 0.1$.

18. A phosphor according to claim 13, wherein $1 \times 10^{-5} \leq z \leq 1 \times 10^{-3}$.

19. A phosphor according to claim 13, wherein $1 \times 10^{-4} \leq a \leq 5 \times 10^{-2}$.

20. A phosphor according to claim 13, wherein $0 \leq b \leq 5 \times 10^{-2}$.

21. A phosphor according to claim 13, wherein $1 \times 10^{-5} \leq c \leq 1 \times 10^{-2}$.

22. A method of making the phosphor of claim 13, comprising:

firing, under a reducing atmosphere, a mixture, forming said phosphor.

23. A sign, comprising the phosphor of claim 13.

24. A paint, comprising the phosphor of claim 13.

25. A toy, comprising the phosphor of claim 13.

26. A phosphor comprising:

a composition having a formula (III)

$$m(M_{1-x}M'_x)O \cdot n(Al_{1-y-z}In_yB_z)_2O_3:aEu^{2+} \quad (III)$$

wherein M is at least one element selected from a group consisting of Sr, Ca and Ba, M' is at least one element selected from a group consisting of Mg, Zn and Cd, $0.3 \leq m/n \leq 2$, $0 \leq x \leq 0.2$, $0 < y \leq 0.2$, $0 < z \leq 0.05$, and $1 \times 10^{-5} \leq a \leq 1 \times 10^{-1}$.

27. A phosphor according to claim 26, wherein $0.4 \leq m/n \leq 1.5$, $0 \leq x \leq 0.1$, $1 \times 10^{-5} \leq y \leq 0.1$, $1 \times 10^{-5} \leq z \leq 1 \times 10^{-3}$, and $1 \times 10^{-4} \leq a \leq 5 \times 10^{-2}$.

28. A phosphor according to claim 26, wherein $0.4 \leq m/n \leq 1.5$.

29. A phosphor according to claim 26, wherein $0 \leq x \leq 0.1$.

30. A phosphor according to claim 26, wherein $1 \times 10^{-5} \leq y \leq 0.1$.

31. A phosphor according to claim 26, wherein $1 \times 10^{-5} \leq z \leq 1 \times 10^{-3}$.

32. A phosphor according to claim 26, wherein $1 \times 10^{-4} \leq a \leq 5 \times 10^{-2}$.

33. A method of making the phosphor of claim 26, comprising:

firing, under a reducing atmosphere, a mixture, forming said phosphor.

34. A sign, comprising the phosphor of claim 26.

35. A paint, comprising the phosphor of claim 26.

36. A toy, comprising the phosphor of claim 26.

* * * * *